(12) United States Patent
McNiece et al.

(10) Patent No.: US 7,517,157 B1
(45) Date of Patent: Apr. 14, 2009

(54) ALL-PLASTIC OPTICAL MINI-CONNECTOR

(75) Inventors: Michael R. McNiece, Scottsdale, AZ (US); John V. Alexander, Mesa, AZ (US); Robert A. Nowak, Mesa, AZ (US); Rick Bomber, San Jose, CA (US); James L. Melquist, Tempe, AZ (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/936,839

(22) Filed: Nov. 8, 2007

(51) Int. Cl.
*G02B 6/38* (2006.01)
*G02B 6/40* (2006.01)
(52) U.S. Cl. .......................... 385/60; 385/54
(58) Field of Classification Search .............. 385/60, 385/74, 58, 105, 54
See application file for complete search history.

(56) References Cited

U.S. PATENT DOCUMENTS

| | | | |
|---|---|---|---|
| 3,825,320 A | | 7/1974 | Redfern |
| 3,846,010 A | * | 11/1974 | Love et al. ............. 385/54 |
| 3,910,678 A | * | 10/1975 | McCartney et al. ........ 385/58 |
| 3,914,015 A | * | 10/1975 | Mc Cartney ............. 385/54 |
| 4,009,931 A | * | 3/1977 | Malsby et al. ............ 385/54 |
| 4,139,260 A | | 2/1979 | Bouygues et al. |
| 4,653,845 A | | 3/1987 | Tremblay et al. |
| 4,730,891 A | | 3/1988 | Poorman |
| 5,195,158 A | * | 3/1993 | Bottoms et al. ........... 385/105 |
| 2007/0196053 A1 | * | 8/2007 | Kewitsch ............... 385/74 |

FOREIGN PATENT DOCUMENTS

GB       1547427 A    6/1979

* cited by examiner

*Primary Examiner*—Frank G Font
*Assistant Examiner*—Robert Tavlykaev
(74) *Attorney, Agent, or Firm*—Ostrager Chong Flaherty & Broitman P.C.

(57) ABSTRACT

An optical fiber connector has a center component provided with opposite first and second ends into which first and second connector inserts holding ends of respective optical fiber bundles are to be inserted, an optical core element mounted in the center component having opposite ends against which the ends of the respective optical fiber bundles in the first and second connector inserts are to be abutted in alignment, and fastener elements provided with the first and second ends for securely holding the first and second connector inserts in abutting contact with the respective opposite ends of the optical core element.

17 Claims, 4 Drawing Sheets

ALL-PLASTIC OPTICAL MINI-CONNECTOR

TECHNICAL FIELD

The invention generally relates to a connector for optical fibers for light transmission, and particularly to one having an all-plastic optical fiber connector that provides for high levels of light transmissivity to the output fibers.

BACKGROUND

Optical fibers are commonly used to transfer light over given spans to provide illumination and for other light transmission applications. Small-diameter fibers of standard fabrication size are bundled in an array of fibers to deliver the desired optical output, and connectors for the bundled fiber arrays are required when the run of fibers has to span different sections or pieces of equipment. Conventional connectors typically are made of metal and consequently are bulky, heavy and costly. These typical connections also require extreme care to align each end of the mating fibers for efficient coupling of light across the connection. Existing applications may require drilling holes through the connector structures for retaining or anchoring them that may result in making them more susceptible to corrosion compromising the strength of the base structure. Another problem with existing types of connectors that are commonly available is they do not provide a high level of optical transmission or a uniform light distribution across the interface between the ends of the optical fiber bundles.

Accordingly, it is desirable to provide a connector for optical fiber bundles that is small in size, light-weight, of low cost, resistant to corrosion, and provides a high level of optical transmission and uniform light distribution across the connector interface.

SUMMARY OF INVENTION

In accordance with the present invention, an optical fiber connector includes a first connector insert for holding exposed ends of a bundle of optical fibers of a specified number packed in a pre-determined packing pattern, a second connector insert for similarly holding exposed ends of an opposite bundle of optical fibers of the specified number packed in the pre-determined packing pattern, and a center connector component having opposite first and second ends into which the first and second connector inserts are respectively inserted, and fasteners provided with the first and second ends for securely holding the first and second connector inserts in abutting contact with an optical core element in the center connector component substantially in alignment with each other in order to obtain a high level of optical transmission and uniform light distribution across the interface between the connected bundles of optical fibers.

In a preferred embodiment, the components of the optical fiber connector are all made from molded plastic material. The connector is designed with tight tolerances to provide minimal light loss. The connector inserts have keyed ends that slot into complementarily keyed ends of the center connector, and the components are securely fastened together by fastener caps that thread onto the opposing connector ends of the center connector component. In a preferred example, the optical fibers are arranged in a dense hexagonal packing pattern. A glass mixing rod with low index of refraction cladding relative to the index of refraction of the center core region is mounted within the center connector component to provide an optimum, light-transmissive aperture. The index of refraction of the center core region closely matches that of the center core of the optical fibers to minimize reflections at this interface. The bundled fiber ends are held in a dense packing pattern in hex sleeves of the connector insert ends, and are coated with optical gel to eliminate any air gap between optical elements and inserted on respective sides of the mixing rod. The connector is capable of evenly coupling, transmitting and distributing light to each of the output fibers at an efficiency of about 65%.

Other objects, features, and advantages of the various embodiments of the present invention will be explained in the following detailed description with reference to the appended drawings.

DETAILED DESCRIPTION

In the following detailed description, certain preferred embodiments are described as illustrations of the invention in a specific application or physical environment in order to provide a thorough understanding of the present invention. Those methods, procedures, components, or functions which are commonly known to persons of ordinary skill in the relevant art are not described in detail as not to unnecessarily obscure a concise description thereof. Certain specific embodiments or examples are given for purposes of illustration only, and it will be recognized by one skilled in the art that the present invention may be practiced in other analogous applications or environments and/or with other analogous or equivalent variations of the illustrative embodiments.

Figure 1:
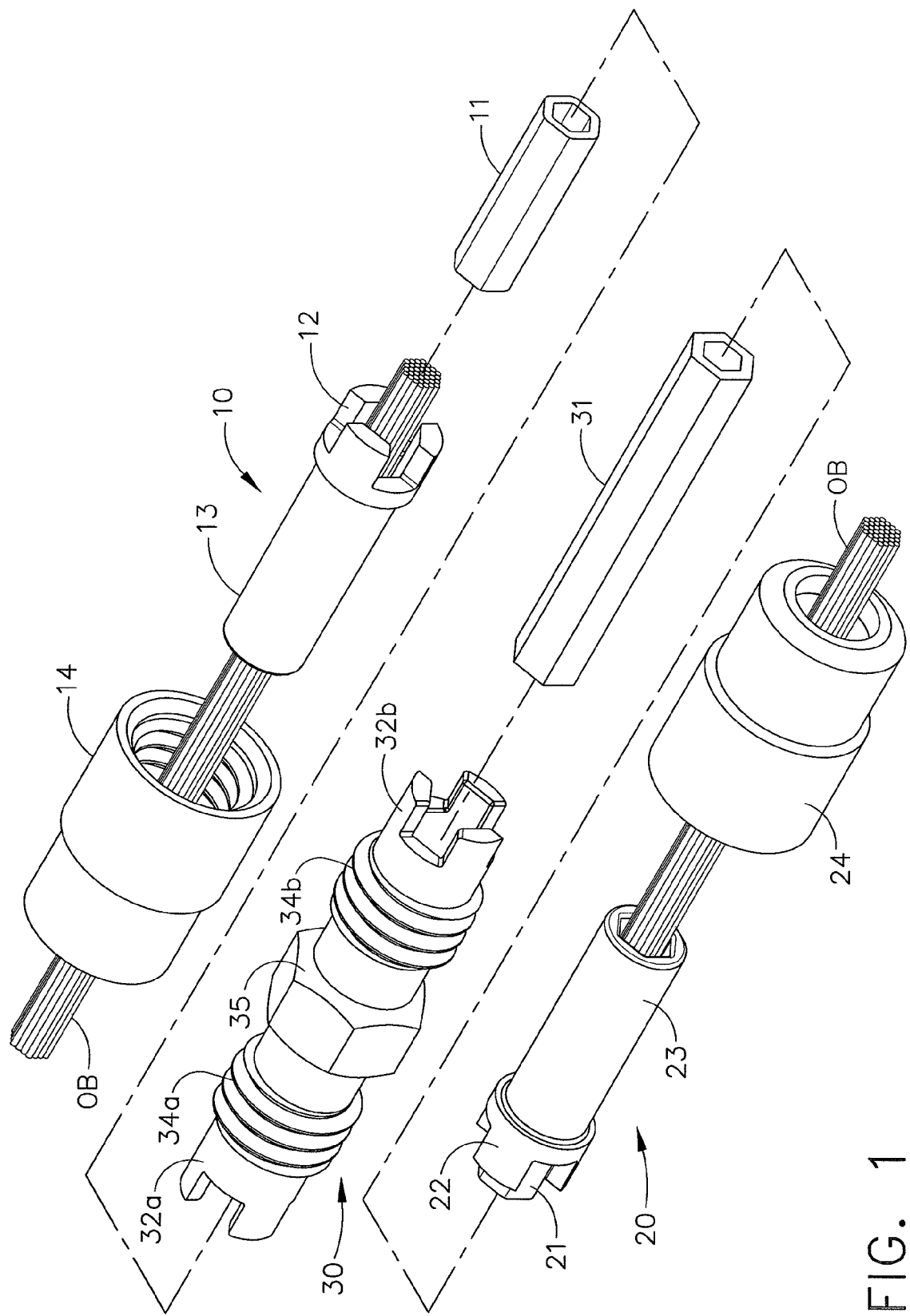
FIG. 1 is an assembly diagram illustrating an optical fiber connector in accordance with an embodiment of the present invention.

Referring to FIG. 1, an embodiment of an optical fiber connector is shown having a three component design of a first connector insert 10 for holding exposed ends of a bundle of optical fibers OB of a specified number packed in a pre-determined packing pattern secured in a ferrule 11, a second connector insert 20 for holding similarly exposed ends of a corresponding bundle of optical fibers of the specified number packed in the pre-determined packing pattern secured in a ferrule 21, and a center connector component 30 for optically connecting the ends of the fiber bundles of the two connector inserts together. Each connector insert 10, 20 has a keyed end 12, 22 that fits in slots of the complementarily keyed ends 32a, 32b of the center connector component 30. A mixing rod 31 is assembled in the center connector component 30 and serves as an optical interface for light transmission spanning the ends of the two optical fiber bundles. The slotted fitting of the keyed ends of the connector inserts results in the packed pattern of fibers of each insert being held in a precise orientation in alignment with each other in order to obtain a high level of optical transmission and uniform light distribution across the interface between their ends. The components of the optical fiber connector are preferably all made from molded plastic material such as ULTEM, a high temperature plastic. External fastener nuts 14, 24 are sleeved over the barrel portions 13, 23 of the connector inserts 10, 20 are threaded onto respective threadings 34a, 34b on the opposite ends of the center connector component 30. A center hex lug 35 on the center connector component 30 is provided for applying torque for fastening and unfastening.

Figure 2A:
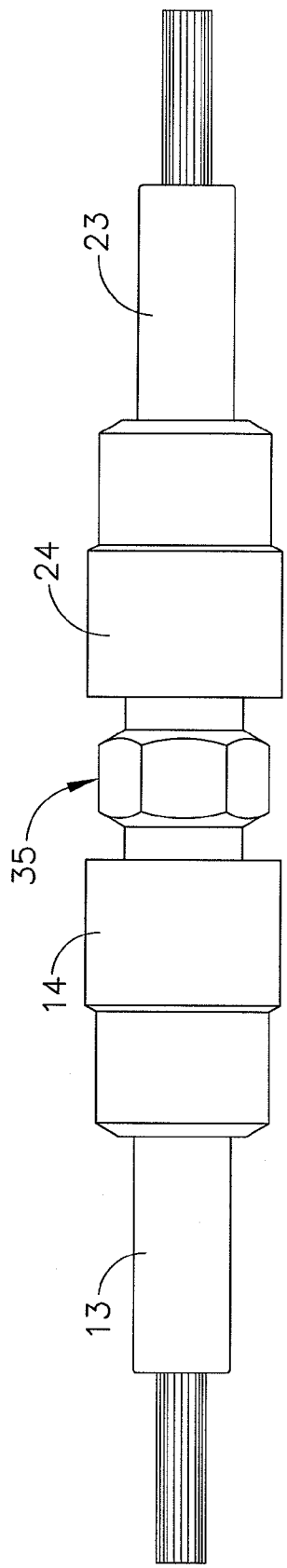
FIGS. 2A and 2B show the assembled optical fiber connector in external and sectional views, respectively.
Figure 2B:
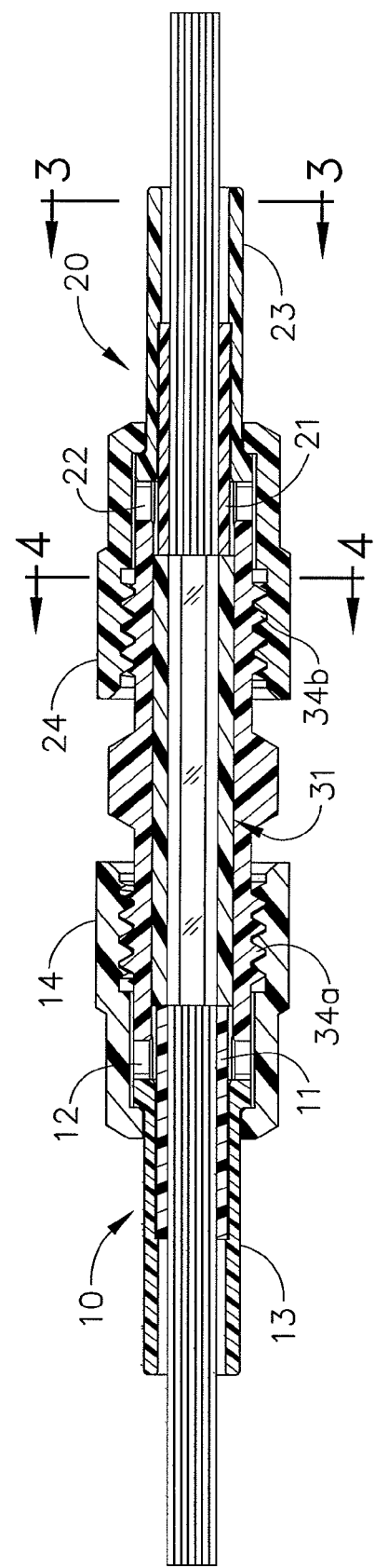

An assembled connector is shown in FIGS. 2A and 2B in external and sectional views, respectively. The fiber ends of the optical fiber bundles OB secured in their ferrules 11, 21 are abutted on each side of the mixing rod 31 and held in alignment by the keyed ends 12, 22 of the connector inserts 10, 20. The fastener caps 14, 24 are fastened to the threadings 34a, 34b of the center connector component 30 to securely hold the entire assembly together, resulting in an optical connector assembly of slim profile. In a preferred example of a 37-fiber bundle of 270 micron fibers, the barrels 13, 23 of the connector inserts have diameters of 0.13 inch, and the center connector component has an outside diameter of 0.25 inch. The length spanning the fastener caps 14, 24 is 0.94 inch, and the length spanning the ends of the connector inserts 10, 20 is 1.55 inch. The length of the center connector component is 0.78 inch, and the length of the mixing rod 31 is 0.60 inch. The assembly is designed for intimate contact and a close dimensional fit between the fiber bundles and the center connector component.

For light transmission applications, multimode optical fiber is used. Multimode fiber is characterized by its ability to allow numerous modes of light to be transmitted simultaneously. With a large core diameter, multimode fiber is coupled easier then single-mode fiber resulting in its wide use in variety of industry, scientific and medical applications. An example of a multimode fiber is APC 210/230/270 high OH fiber, available from Fiberguide Industries, of Sterling, N.J. The fiber has a silica fiber core of 210 microns diameter, an intermediate plastic cladding of 230 microns diameter (10 microns thick), and an outer nylon jacket of 270 microns diameter (20 microns thick).

Figure 3:
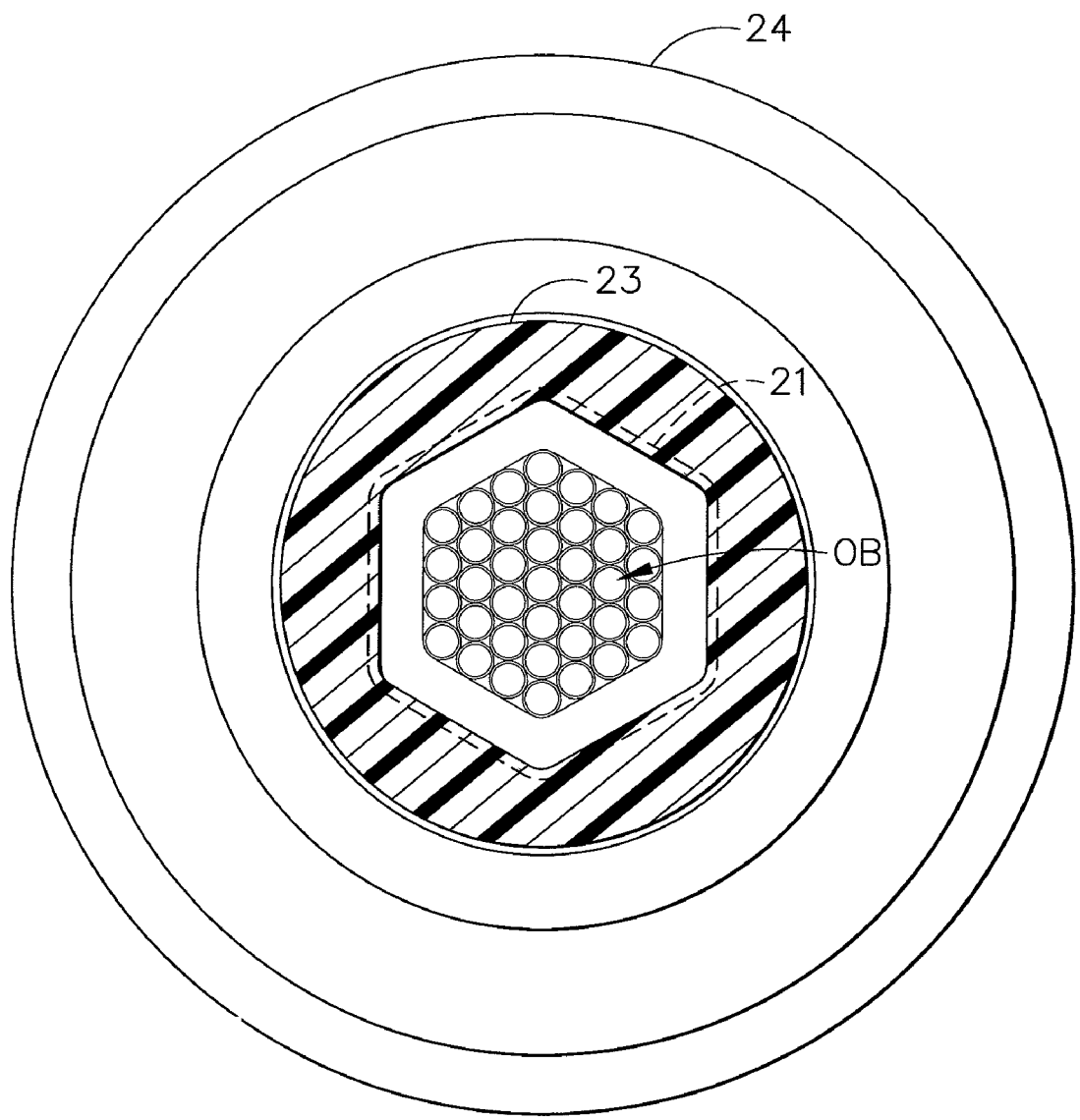
FIG. 3 illustrates a preferred example of a hex packing pattern for an optical fiber bundle for use in the optical fiber connector taken along view lines 3-3 in FIG. 2B.

In FIG. 3, a preferred example of a packing pattern for a 37-fiber bundle is shown. The fibers are bonded in the ferrules 11, 21 with epoxy resin, then the optical faces of the potted fiber bundles are optically ground and polished perpendicular to the long axis of the connector sections. The ferrules have a hex cross-sectional shape matching the inner cross-section of the connector inserts so that they can be sleeved into the connector inserts in proper alignment. 37 optical fibers are arranged in a dense hexagonal packing pattern, although other dense packing arrangements may be used. The optical fibers are fabricated in a standard 270 micron size. The nylon jacket is stripped off at the connector ends to allow for a tighter packing factor, increasing the optical efficiency of the connection. Other numbers of fiber bundles and packing patterns may be used depending on the requirements of the light transmission application. The optimum number of fibers, fiber size, and dense packing arrangement are calculated according to well-known industry formulas, such as those available in a Machinists Handbook or through on line references such as Wikipedia. Reference is made to such industry standard definitions for other examples of dense packing patterns for optical fibers. The hexagonal packing pattern is clamped and held in the ferrules 11, 21. When the connector inserts are fitted into the slots of the keyed ends of the center connector component, the fiber ends of the hex packing pattern are held substantially in alignment with the corresponding fiber ends of the other fiber bundle, thereby ensuring a high level of optical transmission and uniform light distribution across the interface. Tests results indicate that the connector is capable of evenly transmitting in the range of about 65% of incoming broadband light.

Figure 4:
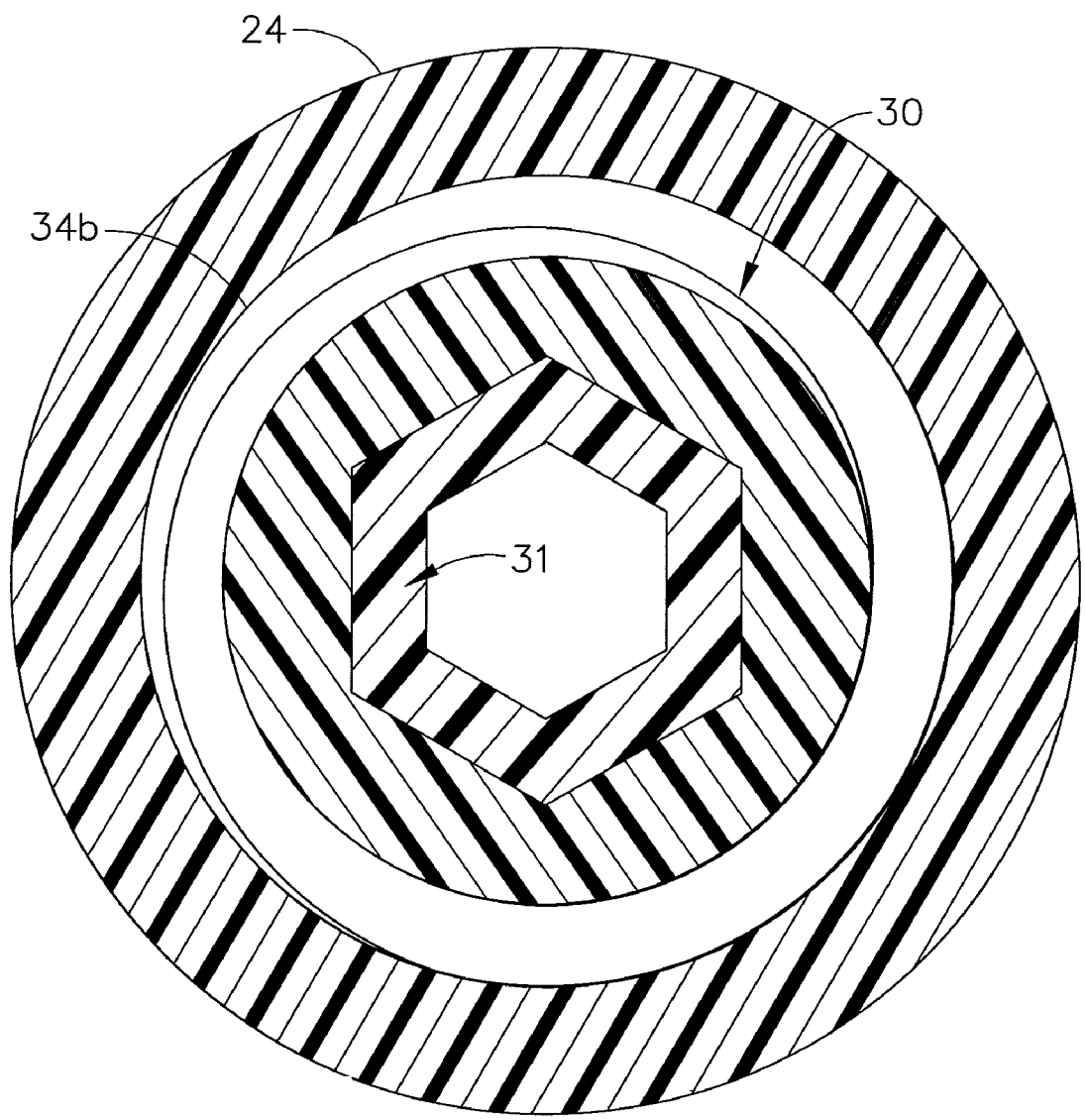
FIG. 4 is a view in section of a mixing rod used in the center connector component of the optical fiber connector taken along view lines 4-4 in FIG. 2B.

In FIG. 4, a view in section of a mixing rod used in the center connector component is shown. The mixing rod 31 is hex-shaped (for alignment) and made of glass material, and is mounted in the center bore of the center connector component 30. This hex rod is allowed to "free float" in center connector component 30 in order to maintain intimate contact with connector inserts 10, 20 when sandwiched in between them. The glass hex rod 31 has a low index of refraction coating or cladding on its outer surface that provides an optimum, light-transmissive aperture. The index of refraction of the center core region closely matches that of the center core of the optical fibers to minimize reflections at this interface. The glass core and cladding index of refraction values are of different values, defined to produce a hex rod with a 0.37 numerical aperture to closely match that of the optical fibers being used. The center connector component is designed with tight tolerances to provide minimal light loss. An optically transmissive gel is applied on the ends of the fiber bundles on each insert side, then the fiber ends (with hex connector sleeve) are inserted into the end apertures on each side of the glass hex rod until they abut each other. The optical gel provides a light transmissive medium for contact between the ends of the respective bundles. An example of a suitable optical gel is one sold under the brand name Code 0608, by Cargille Laboratories, Inc., New Jersey, which has an index of refraction of about 1.46 to closely match that of the glass core of a typical optical fiber.

The optical fiber connection of the present invention thus provides a connector solution that is small in size, lightweight, of low cost, and resistant to corrosion. The structure of the center connector component and light-transmissive aperture ensures a high level of optical transmission and uniform light distribution across the connector interface. The complete assembly offers lower weight for better payload, and all component parts can be injection-molded for a lower cost product. The optical connector is unique in its ability to take input light through any number of input fibers and equally distribute this light to each of the output fibers, regardless of the input to output fiber ratios.

Many modifications and variations may of course be devised given the above description of the principles of the invention. It is intended that all such modifications and variations be considered as within the spirit and scope of this invention, as defined in the following claims.

What is claimed is:

1. An optical fiber connector comprising:
   a first connector insert for holding exposed ends of a bundle of optical fibers of a specified number packed in a pre-determined packing pattern;
   a second connector insert for holding similarly exposed ends of an opposite bundle of optical fibers of the specified number packed in the pre-determined packing pattern;
   a center connector component having opposite first and second ends into which the first and second connector inserts are respectively inserted; and
   fasteners provided with the first and second ends for securely holding the first and second connector inserts so that the optical fiber bundles are in abutting contact with an optical core element in the center connector component and substantially in alignment with each other in order to obtain a high level of optical transmission and uniform light distribution between the optical fiber bundles;
   wherein the fiber ends of each optical fiber bundle are held in a respective ferrule, the respective ferrules having a corresponding hexagonal cross-sectional shape that matches a hexagonal inner cross-section of the connector inserts so that each connector insert has one of the ferrules sleeved into it in proper alignment; and wherein the pre-determined packing pattern is a dense hexagonal packing pattern.

2. An optical fiber connector according to claim 1, wherein said connector evenly transmits light at an efficiency of about 65% or better.

3. An optical fiber connector according to claim 1, wherein the first connector insert, the second connector insert, the center component, the fasteners and the ferrules are made from a molded plastic material.

4. An optical fiber connector according to claim 1, wherein the dense hexagonal packing pattern comprises 4 fiber ends on each hex side.

5. An optical fiber connector according to claim 4, wherein the dense hexagonal packing pattern results in the center connector component having an outside diameter of 0.25 inch.

6. An optical fiber connector according to claim 1, wherein said connector inserts have keyed ends that slot into complementarily keyed ends of the center connector component for rotational alignment of the optical fiber bundles.

7. An optical fiber connector according to claim 1, wherein said fasteners are external fastener caps that thread onto the opposing first and second ends of the center connector component.

8. An optical fiber connector according to claim 1, wherein the optical core element of the center connector component is a glass mixing rod.

9. An optical fiber connector according to claim 8, wherein the glass mixing rod has a hexagonal cross-sectional shape that matches a correspondingly shaped core of the center connector component for proper alignment of the mixing rod with the optical fiber bundles held in the respective connector inserts.

10. An optical fiber connector according to claim 8, wherein the glass mixing rod has a glass core with an index of refraction that closely matches that of the optical fibers to minimize reflections at the interface between the connected bundles of optical fibers.

11. An optical fiber connector according to claim 10, wherein the glass mixing rod has an outer glass cladding of a low index of refraction different from that of the glass core to provide an optimum, light-transmissive aperture.

12. An optical fiber connector according to claim 11, wherein a coating of optical gel is applied on the fiber ends of the optical fiber bundles prior to being abutted on respective sides of the glass mixing rod assembled in the center connector component.

13. An optical fiber connector according to claim 12, wherein the optical gel is selected to have an index of refraction of about 1.46 to closely match that of a multimode optical fiber.

14. An optical fiber connector comprising a center component provided with opposite first and second ends into which a first and second connector insert is to be inserted, the first and second connector inserts each holding ends of a respective optical fiber bundle held in a respective ferrule; an optical core element mounted in the center component having opposite ends against which the ends of the respective optical fiber bundles in the first and second connector inserts are to be abutted in alignment, wherein the ferrules have a hexagonally shaped outer surface and the connector inserts have a corresponding hexagonally shaped inner cross-section; and fastener elements provided with the first and second ends for securely holding the first and second connector inserts.

15. An optical fiber connector according to claim 14, wherein said opposite first and second ends of said center component have keyed ends which match those of the connector inserts to be inserted therein for holding them in rotational alignment with the center component and with each other.

16. An optical fiber connector according to claim 15, wherein the optical core element of the center component is a glass mixing rod having a cross-sectional shape that matches a correspondingly shaped cross-section of the center component for proper alignment of the mixing rod with the optical fiber bundles in the connector inserts.

17. An optical fiber connector according to claim 14, wherein the center component, the first and second connector inserts and the ferrules are made from a molded plastic material.

* * * * *